(12) United States Patent
Malvino

(10) Patent No.: US 8,174,753 B2
(45) Date of Patent: *May 8, 2012

(54) METHODS AND CIRCUITS FOR DISTRIBUTING POWER TO SPD LOADS

(75) Inventor: Albert P Malvino, Corpus Christi, TX (US)

(73) Assignee: Research Frontiers Inc., Woodbury, NY (US)

( * ) Notice: Subject to any disclaimer, the term of this patent is extended or adjusted under 35 U.S.C. 154(b) by 123 days.

This patent is subject to a terminal disclaimer.

(21) Appl. No.: 12/045,508

(22) Filed: Mar. 10, 2008

(65) Prior Publication Data

US 2008/0204856 A1 Aug. 28, 2008

Related U.S. Application Data

(63) Continuation of application No. 11/049,034, filed on Jan. 18, 2005, now Pat. No. 7,417,785.

(51) Int. Cl.
G02B 26/00 (2006.01)
G09G 5/00 (2006.01)

(52) U.S. Cl. ........... 359/296; 345/107

(58) Field of Classification Search ............. 359/296, 359/452, 243, 253, 240; 345/105, 107, 108, 345/111; 307/11–20, 31, 32, 82, 83; 363/84–94, 363/95–99, 131–139, 34, 35; 310/101; 362/217, 362/218, 219

See application file for complete search history.

(56) References Cited

U.S. PATENT DOCUMENTS

| | | | |
|---|---|---|---|
| 4,247,175 A | 1/1981 | Saxe | 359/296 |
| 4,407,565 A | 10/1983 | Saxe | 359/296 |
| 4,877,313 A | 10/1989 | Saxe et al. | 359/253 |
| 5,002,701 A | 3/1991 | Saxe | 252/586 |
| 5,093,041 A | 3/1992 | Check, III et al. | 252/585 |
| 5,204,772 A | 4/1993 | Hirata et al. | 359/296 |
| 5,409,734 A | 4/1995 | Lee et al. | 427/163.1 |
| 5,463,491 A | 10/1995 | Check, III | 359/296 |
| 5,463,492 A | 10/1995 | Check, III et al. | 359/296 |
| 5,516,463 A | 5/1996 | Check, III et al. | 252/585 |
| 5,746,806 A * | 5/1998 | Aylsworth et al. | 95/8 |
| 5,764,402 A * | 6/1998 | Thomas et al. | 359/272 |
| 5,765,939 A * | 6/1998 | Tanner, Jr. | 362/219 |
| 5,765,944 A * | 6/1998 | Fallon et al. | 362/359 |
| 6,078,109 A | 6/2000 | Yanagisawa | 307/18 |
| 6,281,602 B1 | 8/2001 | Got et al. | 307/66 |

(Continued)

FOREIGN PATENT DOCUMENTS

JP 09-182289 7/1997

(Continued)

OTHER PUBLICATIONS

U.S. Appl. No. 10/744,930, filed Feb. 9, 2004.

(Continued)

*Primary Examiner* — Mohammed Hasan (74) *Attorney, Agent, or Firm* — Ostrolenk Faber LLP (57) ABSTRACT

Methods and circuits for distributing power to suspended-particle-device (SPD) film products including SPD windows, SPD shades, and other SPD products, which are referred to generally as SPD loads. A driving voltage derived from a primary power source is provided to an SPD load by backbone wiring which carries a low AC or DC voltage derived from the primary power source, and a conversion stage which converts the low voltage to an AC driving voltage which is then supplied to the SPD load.

27 Claims, 4 Drawing Sheets

U.S. PATENT DOCUMENTS

| | | | |
|---|---|---|---|
| 6,529,312 B1 | 3/2003 | Saxe | 359/296 |
| 6,804,040 B2 * | 10/2004 | Malvino et al. | 359/296 |
| 6,840,040 B1 | 1/2005 | Hoffeld et al. | 60/336 |
| 6,863,499 B2 * | 3/2005 | Pearce | 416/210 R |
| 6,863,573 B1 * | 3/2005 | Kohler | 439/646 |
| 6,922,499 B2 * | 7/2005 | Boie et al. | 385/18 |
| 7,417,535 B2 * | 8/2008 | Mathews et al. | 340/533 |
| 7,486,342 B2 | 2/2009 | Mathey et al. | |
| 2002/0040851 A1 | 4/2002 | McNeil-Watson et al. | 204/549 |
| 2002/0186451 A1 | 12/2002 | Saxe | 359/296 |
| 2004/0141343 A1 * | 7/2004 | Lin | 363/65 |
| 2004/0165251 A1 | 8/2004 | Malvino | 359/296 |

FOREIGN PATENT DOCUMENTS

| | | |
|---|---|---|
| JP | 2004-229496 | 8/2004 |
| JP | 2004-534282 | 11/2004 |
| WO | WO 95/06973 | 3/1995 |
| WO | WO 2004/077649 | 9/2004 |

OTHER PUBLICATIONS

International Search Report dated Jun. 8, 2007.

Supplementary European Search Report dated Mar. 3, 2009 corresponding to European Patent Application No. 06718247.7 (PCT/US2006001152).

J. M. Zhang et al., "A 30V/1MHz AC/AC converter for high frequency AC distributed power system applications", APEC 2003. 18th Annual IEEE Applied Power Electronics Conference and Exposition, Miami Beach FL., Feb. 9-13, 2003, IEEE, US, vol. 2, pp. 795-798.

Shiguo Luo et al., "A high-frequency AC distributed power system with dual PWM buses", APEC 2003. 18th Annual IEEE Applied Power Electronics Conference and Exposition, IEEE US, vol. 1, Feb. 9, 2003, pp. 63-68.

Japanese Office Action dated Nov. 21, 2011 in corresponding Japanese Patent Application No. 2007-552182.

* cited by examiner

METHODS AND CIRCUITS FOR DISTRIBUTING POWER TO SPD LOADS

CROSS REFERENCE TO RELATED APPLICATION

The present application is a continuation of U.S. Ser. No. 11/049,034, filed Jan. 18, 2005 now U.S. Pat. No. 7,417,785 B2, the contents of which are hereby incorporated by reference.

BACKGROUND OF THE INVENTION

1. Field of the Invention

This invention relates to power-efficient and low-cost methods for distributing power to SPD loads including SPD windows, SPD shades, and other window enhancements or other devices incorporating SPD film.

2. Description of the Related Art

Light valves have been known for more than seventy years for the modulation of light. As used herein, a light valve is defined as a cell formed of two walls that are spaced apart by a small distance, at least one wall being transparent, the walls having electrodes thereon, usually in the form of transparent, electrically conductive coatings. The cell contains a light-modulating element (sometimes herein referred to as an "activatable material"), which may be either a liquid suspension of particles, or a plastic film in which droplets of a liquid suspension of particles are distributed.

The liquid suspension (sometimes herein referred to as "a liquid light valve suspension" or "a light valve suspension") comprises small, anisometrically shaped particles suspended in a liquid suspending medium. In the absence of an applied electrical field, the particles in the liquid suspension assume random positions due to Brownian movement, and hence a beam of light passing into the cell is reflected, transmitted or absorbed, depending upon the cell structure, the nature and concentration of the particles, and the energy content of the light. The light valve is thus relatively dark in the OFF state. However, when an electric field is applied through the liquid light valve suspension in the light valve, the particles become aligned and for many suspensions most of the light can pass through the cell. The light valve is thus relatively transparent in the ON state. Light valves of the type described herein are also known as "suspended particle devices" or "SPDs."

Light valves have been proposed for use in numerous applications including, e.g., alphanumeric and graphic displays; television displays; filters for lamps, cameras, optical fibers, and windows, sunroofs, sunvisors, eyeglasses, goggles and mirrors and the like, to control the amount of light passing therethrough or reflected therefrom as the case may be. As used herein the term "light" generally refers to visible electromagnetic radiation, but where applicable, "light" can also comprise other types of electromagnetic radiation such as, but not limited to, infrared radiation.

For many applications, as would be well understood in the art, it is preferable for the activatable material, i.e., the light modulating element, to be a plastic film rather than a liquid suspension. For example, in a light valve used as a variable light transmission window, a plastic film, in which droplets of liquid suspension are distributed, is preferable to a liquid suspension alone because hydrostatic pressure effects, e.g., bulging, associated with a high column of liquid suspension, can be avoided through use of a film, and the risk of possible leakage can also be avoided. Another advantage of using a plastic film is that in a plastic film, the particles are generally present only within very small droplets, and hence do not noticeably agglomerate when the film is repeatedly activated with a voltage.

As used herein, the terms "SPD film" and "light valve film" mean at least one film or sheet comprising a suspension of particles used or intended for use by itself or with other components as part of a light valve. The light valve film or SPD film comprises either: (a) a suspension of particles dispersed throughout a continuous liquid phase enclosed within one or more rigid or flexible solid films or sheets, or (b) a discontinuous phase of a liquid comprising dispersed particles, the discontinuous phase being dispersed throughout a continuous phase of a rigid or flexible solid film or sheet. The light valve film or SPD film may also comprise one or more other layers such as, without limitation, a film, coating or sheet, or combination thereof, which may provide the light valve film or SPD film with, for example, (1) scratch resistance (2) protection from ultraviolet radiation (3) reflection of infrared energy, and/or (4) electrical conductivity for transmitting an applied electric or magnetic field to the activatable material.

U.S. Pat. No. 5,409,734 exemplifies a type of light valve film that is formed by phase separation from a homogeneous solution. Light valve films made by cross-linking emulsions are also known. Examples of these are described in U.S. Pat. Nos. 5,463,491 and 5,463,492, both of which are assigned to the assignee of the present invention.

U.S. Pat. No. 6,804,040 B2 describes a method and device for controlling the ac voltage provided to a suspended particle device, hereafter called an SPD.

When the electric field is zero, the suspended particles are randomly oriented because of Brownian movement, and this randomness usually has the effect of reducing or blocking the passage of light. Upon application of an electric field, the particles align, usually with their long axes parallel to the electric field, which allows light to pass through the SPD load.

With currently available SPD films, a nominal AC voltage of 120 V can create a clear state, whereas the absence of voltage results in a dark state. Intermediate voltages produce light transmissions between the clear and dark states, that is, relative light transmission between 0 and 100 percent. The exact value of acceptable voltage required for a clear state depends on the thickness of the dielectric layer between conducting layers, the dielectric constant of the SPD emulsion, and the nature of the SPD particles. The function of an SPD controller is to produce an AC voltage between 0 and $V_{max}$, the voltage level that produces a subjectively acceptable level of window clarity in a given application. Although voltages as low as 60 VAC may be acceptable in some applications, this discussion assumes 120 V rms as the standard value for $V_{max}$ because 120 VAC produces an acceptable clear state in all of today's SPD films. Future films may eventually operate with voltages as low as 10 VAC or lower, when the films become thinner or more efficient, for example.

The following is a brief description of liquid light valve suspensions known in the art which are useful in forming windows retrofitted with a switchable glazing, although the invention is not limited to the use of only such suspensions, nor is it limited to the use of switchable glazings per se since alternate classes of light modulating devices (e.g., non-switchable devices), as described below, can be used in place of such switchable window enhancements.

1. Liquid Suspending Media and Stabilizers

A liquid light valve suspension for use with the invention may be any liquid light valve suspension known in the art and may be formulated according to techniques well known to one skilled in the art. The term "liquid light valve suspension", as used herein, means a "liquid suspending medium" in which a plurality of small particles is dispersed. The "liquid suspending medium" comprises one or more non-aqueous, electrically resistive liquids in which there is preferably dissolved at least one type of polymeric stabilizer, which acts to reduce the tendency of the particles to agglomerate and to keep them dispersed and in suspension.

Liquid light valve suspensions useful in the present invention may include any of the liquid suspending media previously proposed for use in light valves for suspending the particles. Liquid suspending media known in the art which are useful herein include, but are not limited to, the liquid suspending media disclosed in U.S. Pat. Nos. 4,247,175 and 4,407,565. In general, at least one of the liquid suspending medium and the polymeric stabilizer dissolved therein is chosen in a manner known in the art so as to maintain the suspended particles in gravitational equilibrium.

The polymeric stabilizer, when employed, can be a single solid polymer that bonds to the surface of the particles, but which also dissolves in the non-aqueous liquid or liquids of the liquid suspending medium. Alternatively, two or more solid polymeric stabilizers may serve as a polymeric stabilizer system. For example, the particles can be coated with a first type of solid polymeric stabilizer such as nitrocellulose which, in effect, provides a plain surface coating for the particles, after which they are re-coated with one or more additional types of solid polymeric stabilizer that bond to or associate with the first type of solid polymeric stabilizer and which also dissolve in the liquid suspending medium to provide dispersion and steric protection for the particles. Also, liquid polymeric stabilizers may be used to advantage, especially in SPD light valve films, as described in U.S. Pat. No. 5,463,492.

2. Particles

Inorganic and organic particles may be incorporated into a light valve suspension useful in forming a switchable enhancement for use in retrofitting a window in accordance with the present invention. Such particles may be either light-absorbing or light-reflecting in the visible portion of the electromagnetic spectrum. For some particular applications the particles can be reflective at infrared wavelengths.

Conventional SPD light valves have generally employed polyhalide particles of colloidal size, that is the particles generally have a largest dimension averaging about 1 micron or less. As used herein, the term "colloidal", when referring to particle size, shall have the meaning given in the preceding sentence. Preferably, most polyhalide or other particles used or intended for use in an SPD light valve suspension used in accordance with the invention will have a largest dimension which averages less than one-half of the wavelength of blue light, i.e., less than 2000 Angstroms, to keep light scatter extremely low. As used herein, the term "anisometric", which refers to particle shape, means that at least one dimension is larger than another. Typically, anisometric particles (sometimes referred to as particles which are anisometrically shaped), are desirable in an SPD light valve suspension so that the particles will block less light when the suspension is activated than when it is unactivated. For some suspensions the reverse is true, however. Desirable anisometric shapes for the particles include, without limitation thereto, particles shaped like rods, cylinders, plates, needles, blades, prisms, and other shapes known in the art.

A detailed review of prior art polyhalide particles is found in "The Optical Properties and Structure of Polyiodides" by D. A. Godina and G. P. Faerman, published in "The Journal of General Chemistry", Vol. 20, pp. 1005-1016 (U.S.S.R. 1950).

Herapathite, for example, is defined as a quinine bisulfate polyiodide, and its formula is given under the heading "quinine iodsulfate" as $4C_{20}H_{24}N_2O_2.3H_2SO_4.2HI.I_4.6H_2O$ in The Merck Index, 10.sup.th Ed. (Merck & Co., Inc., Rahway, N.J.). In polyiodide compounds, the iodide anion is thought to form chains and the compounds are strong light polarizers. See U.S. Pat. No. 4,877,313 and Teitelbaum et al. JACS 100 1978), pp. 3215-3217. The term "polyhalide" is used herein to mean a compound such as a polyiodide, but wherein at least some of the iodide anion may be replaced by another halide anion. More recently, improved polyhalide particles for use in light valves have been proposed in U.S. Pat. Nos. 4,877,313, 5,002,701, 5,093,041 and 5,516,463. These "polyhalide particles" are formed by reacting organic compounds, usually containing nitrogen, with elemental iodine and a hydrohalide acid or an ammonium halide, alkali metal halide or alkaline earth metal halide.

For some applications, however, it may be desirable to use non-polyhalide particles in light valve suspensions and films, especially where the stability of the material composing the particles is known to be excellent.

3. Power Sources

Regardless of the type of SPD load, it is currently the practice to apply a high AC voltage to the SPD load to attain maximum clarity, that is, maximum light transmission through the SPD film. This applied voltage is typically 120 VAC at 60 Hz, which makes SPD loads ideal for use with ac power available in the United States. For those countries where 240 VAC at 50 Hz is common, a 2-to-1 step-down transformer may be used to obtain 120 VAC. There is no noticeable difference between 50 Hz and 60 Hz for running an SPD load.

U.S. Pat. No. 6,804,040 B2 describes an SPD controller, a method and device for controlling a high ac voltage provided to an SPD load. Basically, it modulates 120 VAC to produce an output that is adjustable manually, automatically, or by remote control to vary the voltage being applied to an SPD load from 0 to 120 VAC. The low end of the range (0 V) produces a dark state, that is, very little transmission of incident light. The high end of the range (120 VAC) produces a clear state, that is very high transmission of incident light. Intermediate voltages between 0 and 120 VAC produce intermediate light transmissions between the dark and clear states.

Figure 1:
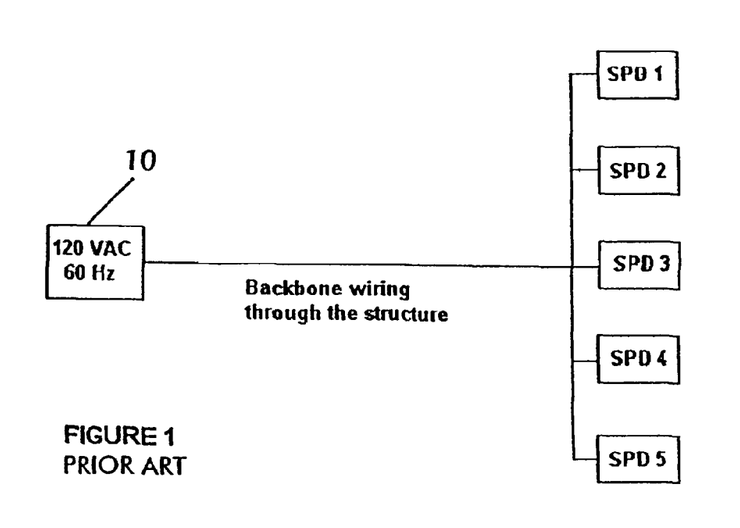
FIG. 1 is a diagram of the power distribution commonly used with multiple SPD loads for architectural structures in the United States and other countries using a nominal line voltage of 120 VAC at 60 Hz.

Turning initially to FIG. 1, there is shown a conventional distribution of AC power from a source 10 to SPD loads SPD1-SPD5 in architectural applications. In the United States, the line voltage has a nominal value of 120 VAC at 60 Hz. Although voltages less than 120 VAC may produce almost clear states with some SPD film types, 120 VAC is the ideal at present for SPD loads because it produces a fully clear state in all SPD films. In Europe, the nominal line voltage is 240 VAC at 50 Hz. In Europe, a 2-to-1 step-down transformer is used to obtain the desired maximum voltage of 120 VAC.

In FIG. 1, the use of five SPD loads is shown, for illustration only. The actual number of SPD loads will depend on the size of the architectural structure, the total window area involved, the number of individual SPD controllers being used, and other factors. Although five SPD loads will be shown in the figures herein, a much larger number of SPD loads may be present in various embodiments of the invention. In some large office buildings, hundreds or even thousands of SPD loads may be present.

To understand some of the problems involved in power distribution, we need to discuss the power requirements of SPD loads. To begin with, SPD film capacitance may vary from 40 nF per square foot (hereafter abbreviated sf) to 90 nF per sf. The former capacitance is for the darkest film type currently available and the latter is for the lightest film type.

The corresponding capacitive reactances for the foregoing capacitances are approximately 66 kilohms/sf and 30 kilohms/sf. At 120 VAC and 60 Hz, these impedances result in ac currents of 1.8 mA/sf and 4 mA/sf. These data are summarized below for later reference:

Input: 120 VAC at 60 Hz
40 nF film: 1.8 mA/sf
90 nF film: 4 mA/sf

As an example of calculating required SPD load current, assume an architectural structure of 3000 square feet with a 20 percent window area of 600 square feet of 90 nF film. Then, the total SPD load current is $$I=(600 \text{ sf})(4 \text{ mA/sf})=2.4 \text{ A}$$

If 40 nF film is used instead of 90 nF film, the total SPD current decreases to $$I=(600 \text{ sf})(1.8 \text{ mA/sf})=1.08 \text{ A}$$

The wiring that runs throughout the structure of FIG. 1 must conform with the United States National Electrical Code (NEC). Because of the high ac voltage being distributed, the National Electrical Code addresses a number of issues such as prevention of electric shock, fire hazard, etc. It is the intent of this invention to mitigate some of these issues by distributing power to SPD loads in a safer and less costly manner.

SUMMARY OF THE INVENTION

The present invention is directed to methods for distributing power throughout a home, office, automobile, aircraft, ocean vessel, or any other structure with single or multiple SPD loads at various locations throughout the structure. The invention distributes a low voltage, either ac or dc, which is then converted to a much higher ac voltage for being applied to each SPD load.

The present invention provides for distribution of the power required by SPD loads in a novel, cost-effective, and safe manner. As used herein the term "SPD load" includes SPD films, SPD light valves, and all other SPD products that rely on the application of an electric field to control the orientation of suspended particles.

According to an aspect of the invention, a driving voltage from a primary power source is provided to an SPD load by backbone wiring which carries a low voltage derived from the primary power source; and a conversion stage which converts the low voltage to an AC driving voltage and supplies the AC driving voltage to the SPD load.

In preferred embodiments of the invention, the low voltage may be 12 VAC or 12 VDC, for example, and the AC driving voltage may be 120 VAC.

The conversion stage may comprise one or more step-up transformer, and a step-down transformer may be provided for stepping down the supplied AC to the low AC voltage on the backbone wiring.

If the low voltage on the backbone wiring is DC, the conversion stage may comprise one or more step-up dc-ac converter, and a step-down ac-dc converter may be provided for stepping down the supplied AC to the low DC voltage on the backbone wiring.

In some embodiments of the invention, there may be a plurality of step-up transformers or DC-AC converters, possibly a respective step-up transformer or DC-AC converter for each of the SPD loads. There may also be a plurality of backbones, and/or a plurality of step-down transformers or AC-DC converters, in various configurations, possibly corresponding to respective SPD loads.

In an embodiment in which the SPD loads comprise windows, the corresponding step-up transformers or DC-AC converters may be assembled into the windows.

The primary power source may comprise a battery which supplies the low DC voltage. A charger for the battery may in turn be powered by a solar cell.

Advantageously, in the conversion stage, a DC-AC step-up converter may have a low operating frequency of substantially 10-15 Hz or slightly higher, more preferably about 15 Hz, thereby exhibiting a low SPD load current without causing noticeable flicker.

Other features and advantages of the present invention will become apparent from the following description of embodiments of the invention which refers to the accompanying drawings in which like references denote like elements and parts and unnecessary redundant description is avoided.

DESCRIPTION OF EMBODIMENTS OF THE INVENTION

Figure 2:
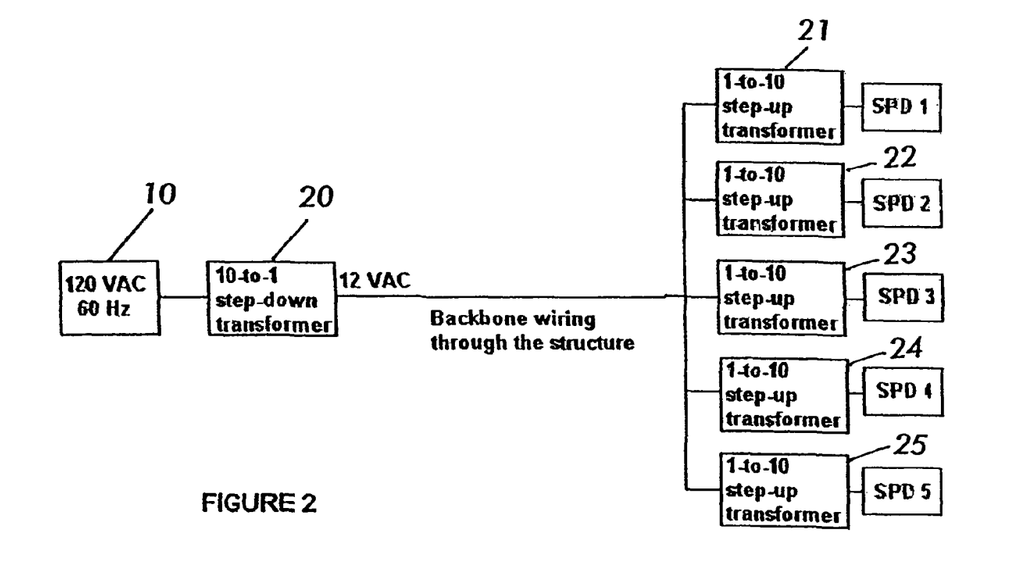
FIG. 2 is a diagram showing reduction of 120 VAC line voltage to a much lower ac voltage of 12 VAC for distribution and subsequent step-up to 120 VAC for use by SPD loads.

FIG. 2 shows one embodiment of the present invention, which overcomes the disadvantage of running 120 VAC to each SPD location throughout an architectural structure. A 10-to-1 step-down transformer 20 is used to reduce the distributed voltage from 120 VAC to 12 VAC. The use of a 10-to-1 step-down factor is for illustration only. The step-down factor can be any factor that reduces the 120 VAC to any low ac voltage. For instance, a 20-to-1 step-down would result in running 6 VAC throughout the structure.

As shown in FIG. 2, 1-to-10 step-up transformers 21-25 are connected respectively to the SPD loads SPD1-SPD5. These reciprocal transformers will restore the voltage to 120 VAC, which is then applied to the SPD controller at that location. In this way, the long wire runs of high ac voltage between the original 120 VAC source and the individual SPD loads are avoided. This simplifies many of the stringent installation procedures of the NEC, because only a low ac voltage is being distributed throughout the structure.

Figure 3:
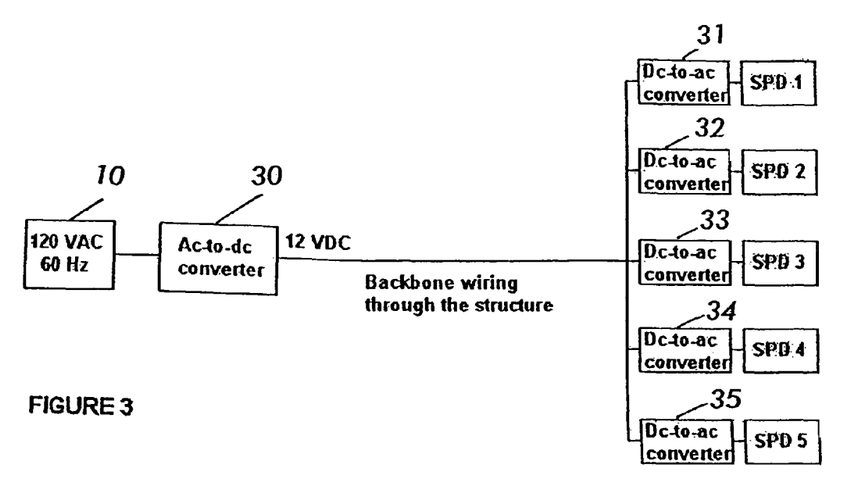
FIG. 3 is a diagram that shows an ac-to-dc converter that converts 120 VAC to 12 VDC to allow distribution of low dc voltage throughout the structure for subsequent conversion back to high ac voltage for SPD loads.

FIG. 3 shows another embodiment of the invention. Rather than distributing a low ac voltage, we can distribute a low dc voltage. In this case, the high ac line voltage of 120 VAC is first converted to 12 VDC by means of an ac-to-dc converter 30. This low dc voltage is then distributed throughout the structure to all SPD locations. At each SPD location, reciprocal dc-to-ac converters 31-35 convert the 12 VDC to 120 VAC. Again, the use of 12 VDC is arbitrary because the invention can use any low ac voltage such as 6 V, 15 V, 24 V, etc., provided the reciprocal dc-to-ac converter produces an output of 120 VAC or whatever high ac voltage is adequate to produce a clear state at the SPD load. In some applications with certain SPD films, an ac voltage of 60 V may be deemed acceptable.

In this and other embodiments, additional electronics (not shown) associated with the converters 31-35 can modulate the 120 VAC output voltage to produce the desired level of light transmission.

Figure 4:
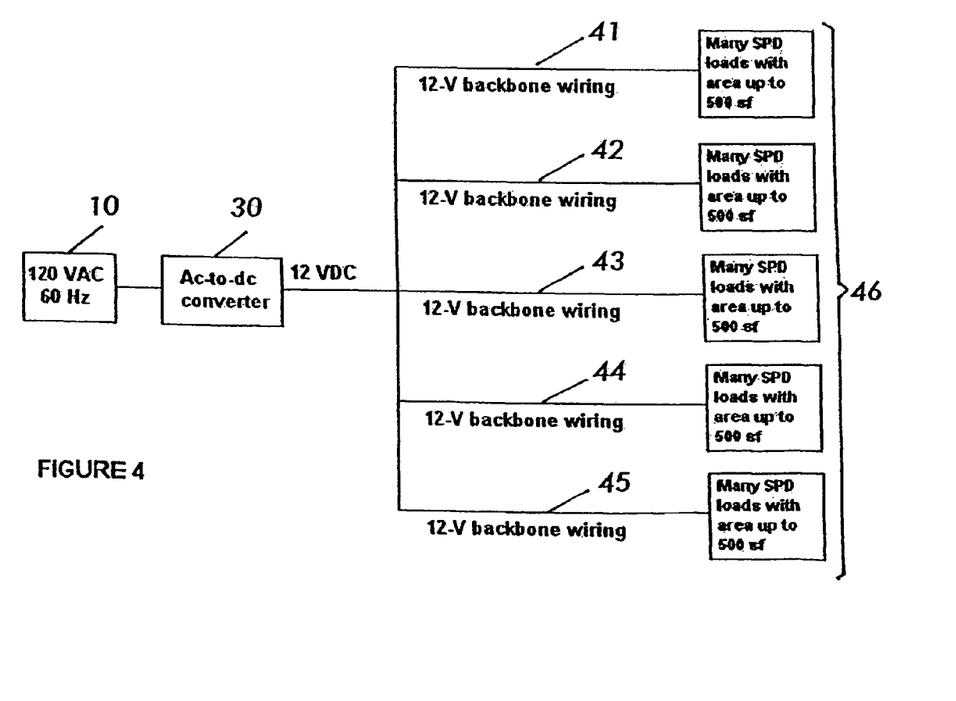
FIG. 4 is a diagram showing an ac-to-dc converter driving several backbones distributing 12 VDC to hundreds or thousands of SPD devices in large architectural structures.

In very large structures such as office buildings, there may hundreds or thousands of SPD loads. In this case, several backbones of 12-V wiring may be needed to limit the backbone current from the ac-to-dc converter 30 to acceptable levels. FIG. 4 illustrates this idea. In this example, each of the 12-V backbones 41-45 carries the current for up to 500 sf of SPD film, indicated schematically at 46. As indicated earlier, 90 nF film requires 4 mA per sf, which implies a total SPD load current of 2 A at 120 V. This translates to a dc current of 20 A at 12 V. AWG 14 wire can handle 20 A with a safety factor of more than 50 percent because AWG 14 wire is rated at 32 A.

A disadvantage of the approach shown in FIG. 4 is the large current that exists in the wiring between the ac-to-dc converter 30 and the five backbones 41-45. Since each backbone carries 20 A, the total current requirement out of the ac-to-dc converter 30 would be 100 A. Such a large current would require a very heavy-duty ac-to-dc converter as well as very large wire diameter between the ac-to-dc converter and the junction of the five backbone lines.

Figure 5:
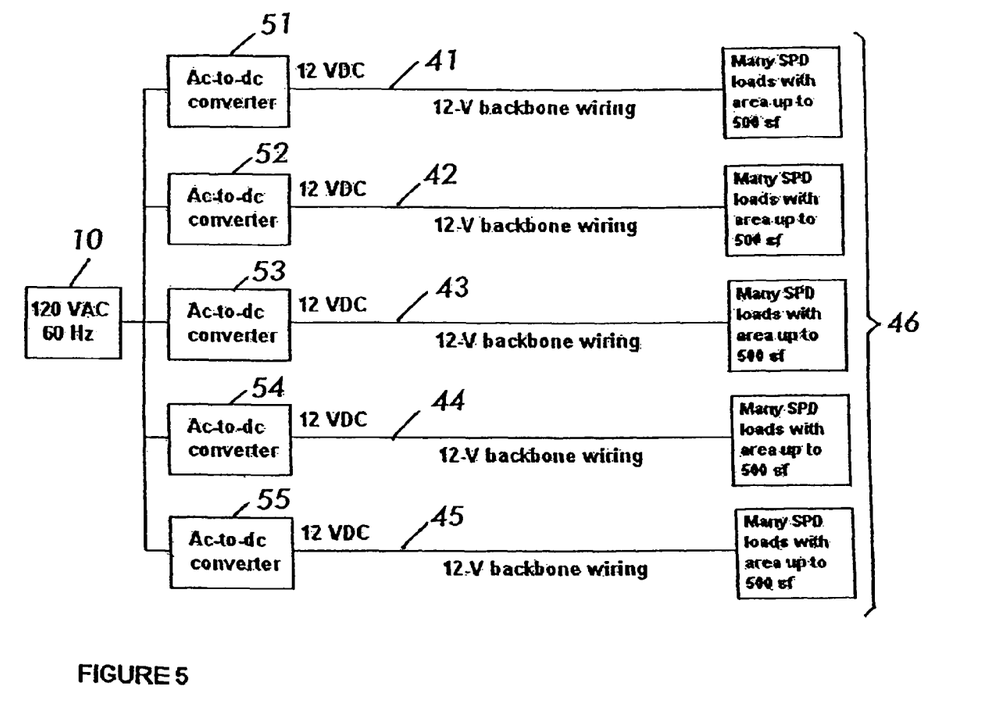
FIG. 5 is a diagram showing several ac-to-dc converters driving an equal number of backbones distributing 12 V to hundreds or thousands of SPD devices in large architectural structures.

FIG. 5 shows an embodiment of the invention that eases the large current requirements of FIG. 4. The idea in FIG. 5 is to use several ac-to-dc converters 51-55, one for each of the backbones 41-45, to reduce the output current from 100 A to 20 A, the value of the backbone current.

Figure 6:
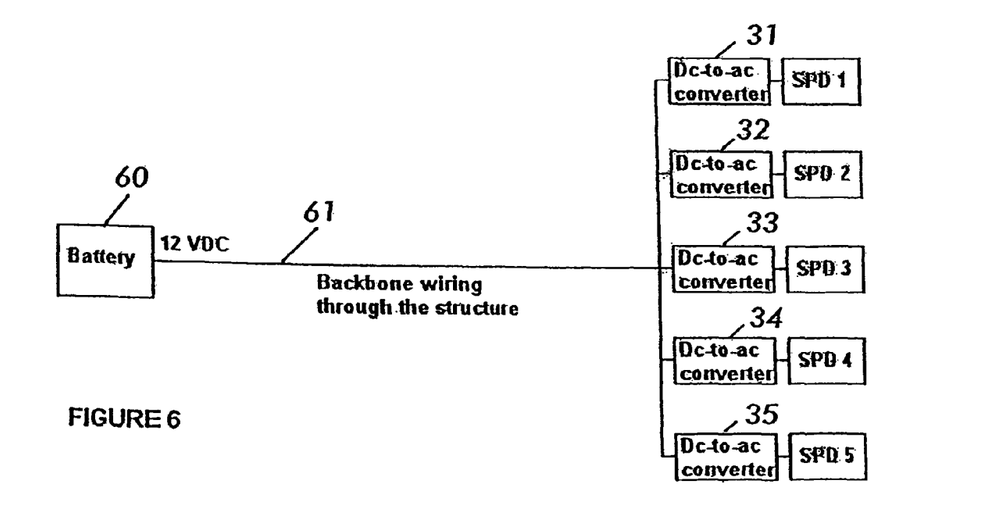
FIG. 6 is a diagram showing distribution of a low dc voltage available from battery sources as found in automobiles, aircraft, or other battery-sourced structures.

For non-architectural structures such as automobiles, aircraft, and ocean vessels, the main source of power is typically a battery 60 that is charged by mechanical, electrical, or solar methods. FIG. 6 shows an embodiment of the invention that can be used with battery-powered systems. For convenience, 12 VDC is the assumed battery voltage, but any relatively low dc voltage is included in the invention. Again, the advantage of this method is the ability to distribute a low dc voltage over a backbone 61 which is inherently safer and subject to less stringent electrical code requirements. As in FIG. 3, dc-to-ac step-up converters 31-35 are provided at the SPD locations SPD1-SPD5.

Because the current in an SPD load is at most 4 mA/sf, the dc-to-ac converters used with SPD loads need to deliver only relatively small load currents. For instance, 16 sf of SPD window using 90 nF film requires only 64 mA at 120 V. For this reason, the dc-to-ac converters used with SPD loads can be designed in very small physical sizes. Furthermore, the low current requirements allow us to design very efficient small modulators or control circuits that can vary the input 120 V to any value between 0 and 120 V. Thus, in FIGS. 3, 6 and 7 a small dc-to-ac step-up converter and a small control circuit can be embedded, for example, inside the window frame used to house the SPD load.

Figure 7:
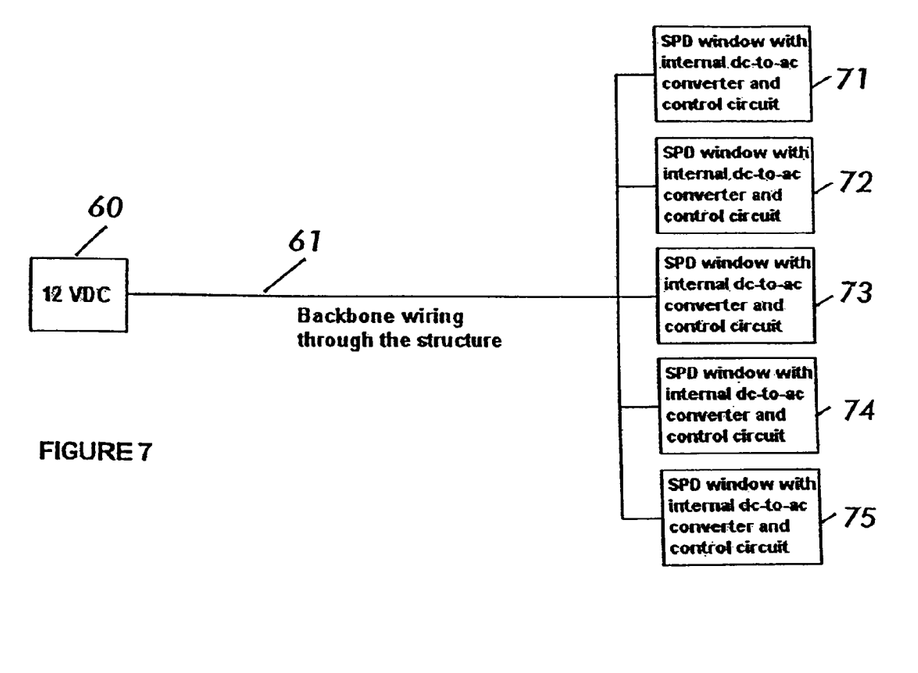
FIG. 7 is a diagram showing distribution of a low dc voltage in any kind of structure to multiple SPD loads with internal dc-to-ac converters and control circuits.

FIG. 7 illustrates the foregoing idea. Each of several self-contained SPD windows 71-75 has its own embedded dc-to-ac step-up converter and control circuit. In this method, only two wires carrying dc current (not shown) are required as the input wires to each SPD window. Self-contained windows with their own internal electronics will greatly simplify the installation of SPD loads in architectural and other structures.

Figure 8:
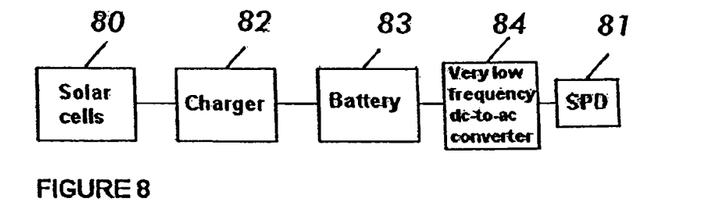
FIG. 8 shows a solar-powered SPD using an extremely low frequency dc-to-ac converter.

FIG. 8 shows a special embodiment of the invention used with a solar-powered SPD window 81. On a bright sunny day, solar cells 80 may generate approximately 20 W per square foot. Since solar cells can be embedded in the window frame (not shown), it is possible to create a self-contained solar-powered SPD window. The basic idea is to allow the solar cells 80 to power a charger 82 to charge a battery 83, which then provides the input power to a dc-to-ac step-up converter 84. To be feasible, enough solar cells must be embedded in the window frame to charge the battery so that it can provide power on overcast days. How long the battery can provide power is determined by its volt-ampere and ampere-hour capacity. In turn, the most important variable in determining how long a battery can provide power on overcast days is the SPD load current.

The capacitive reactance of an SPD load is given by $$X_C = \frac{1}{2\pi f C}$$

With a sinusoidal voltage, the current is given by $$I = \frac{V}{X_C} = 2\pi f C V$$

This equation shows that the SPD load current is directly proportional to the frequency f. Therefore, to minimize the current drain and extend the battery charge on overcast days, we should use the lowest frequency possible.

The limiting factor on lowering the frequency is the flicker frequency, defined as the frequency where the SPD load first begins to visibly blink or flicker. This occurs because the SPD particles randomize in the absence of applied voltage. Since any ac voltage regardless of its waveform has zero crossings, it follows that the SPD particles will attempt to randomize during the voltage transitions that pass through the zero crossings. As discussed in U.S. Pat. No. 6,804,040 B2, the flicker is noticeable in the vicinity of 10 Hz. As recommended in the foregoing patent, the lowest frequency used with SPD should be about 15 Hz to avoid flicker. Therefore, by designing a dc-to-ac converter that operates at substantially 10-15 Hz or slightly higher, and preferably at about 15 Hz, we can reduce the SPD load current by a factor of 4 without causing noticeable flicker. In other words, a given battery charge will provide power to an SPD load four times longer at 15 Hz than at 60 Hz.

SPD films currently available for architectural purposes have decay time constants of approximately 2 seconds and a flicker frequency of 10 Hz. Further improvement may become possible with future SPD films. By increasing the viscosity, varying particle size, and modifying other factors, it may be possible to decrease the flicker frequency to a much lower value. For the sake of illustration, assume an SPD film with a decay time constant of 20 seconds and a flicker frequency of 1 Hz. Such an SPD film would then produce an acceptable clear state with a driving frequency of only 1.5 Hz. In this case, we could design the dc-to-ac converter to operate at 1.5 Hz, which would mean that the SPD load current would be very small. In fact, a given battery charge could run a solar-powered window 40 times longer at 1.5 Hz than at 60 Hz. With a 1.5 Hz dc-to-ac converter, a self-contained solar-powered window would be highly efficient and be able to conserve battery power much longer on overcast days.

Each of the patents and other references noted herein is incorporated into the present specification to the degree necessary to comprehend the invention.

Although the present invention has been described in relation to particular embodiments thereof, many other variations and modifications and other uses will become apparent to those skilled in the art. Therefore, the present invention is not limited by the specific disclosure herein.

What is claimed is:

1. An arrangement for providing a driving voltage from a primary power source to one or more SPD loads, comprising in combination:
   backbone wiring which carries a low voltage derived from said primary power source; and
   a conversion stage which converts said low voltage to a higher voltage AC driving voltage and supplies said AC driving voltage to said one or more SPD loads.

2. An arrangement according to claim 1, wherein said low voltage is substantially 12 VAC.

3. An arrangement according to claim 1, wherein said low voltage is substantially 12 VDC.

4. An arrangement according to claim 1, wherein said primary power source supplies AC, said low voltage on said backbone wiring is AC, said conversion stage comprises at least one step-up transformer, and further comprising a step-down transformer which steps down said supplied AC to said low AC voltage on said backbone wiring.

5. An arrangement according to claim 1, wherein said primary power source supplies DC, and said conversion stage comprises at least one DC-AC step-up converter which supplies said AC driving voltage to at least one said SPD load.

6. An arrangement according to claim 5, wherein said SPD loads comprise windows, and said corresponding DC-AC step-up converters are assembled into said windows.

7. An arrangement according to claim 5, wherein said primary power source comprises a battery which supplies said low DC voltage.

8. An arrangement according to claim 7, further comprising a solar cell which powers a charger for said battery.

9. An arrangement according to claim 5, further comprising at least one dc-ac step-up converter which receives said low DC voltage on said backbone wiring and supplies said AC driving voltage.

10. A method of providing a driving voltage from a primary power source to one or more SPD loads, comprising the steps of:
    feeding a low voltage derived from said primary power source to backbone wiring; and converting said low voltage to a higher voltage AC driving voltage and supplying said AC driving voltage to said one or more SPD loads.

11. A method according to claim 10, wherein said low voltage is substantially 12 VAC.

12. A method according to claim 10, wherein said low voltage is substantially 12 VDC.

13. A method according to claim 10, wherein said primary power source supplies AC, said low voltage on said backbone wiring is AC, and further comprising the steps of using a step-down transformer to step down said supplied AC to said low AC voltage on said backbone wiring, and using at least one step-up transformer for converting said low voltage to said AC driving voltage.

14. A method according to claim 13, further comprising the step of providing a respective step-up transformer for each of said SPD loads.

15. A method according to claim 10, wherein said primary power source supplies DC, and comprising the step of providing at least one DC-AC step-up converter for supplying said AC driving voltage to at least one said SPD load.

16. A method according to claim 15, wherein said SPD loads comprise windows, further comprising the step of assembling said corresponding DC-AC step-up converters into said windows.

17. A method according to claim 15, further comprising the step of providing a battery as said primary power source which supplies said low DC voltage.

18. A method according to claim 17, further comprising the step of providing a solar cell for powering a charger for said battery.

19. A method according to claim 17, further comprising the step of reducing an operating frequency of said DC-AC step-up converter, thereby reducing SPD load current without causing noticeable flicker.

20. A method according to claim 19, wherein said operating frequency is reduced to substantially about 10-15 Hz.

21. A method according to claim 20, wherein said operating frequency is reduced to about 15 Hz.

22. A method according to claim 17, further comprising the step of providing at least one dc-ac step-up converter which receives said low DC voltage on said backbone wiring and supplies said AC driving voltage.

23. A method according to claim 22, further comprising the step of providing a plurality of step-up dc-ac converters for supplying said AC driving voltage.

24. A method according to claim 23, comprising the step of providing a respective step-up dc-ac converter for each of said SPD loads.

25. A method according to claim 15, further comprising the step of providing at least one dc-ac step-up converter which receives said low DC voltage on said backbone wiring and supplies said AC driving voltage.

26. A method according to claim 25, further comprising the step of providing a plurality of step-up dc-ac converters for supplying said AC driving voltage.

27. A method according to claim 26, comprising the step of providing a respective step-up dc-ac converter for each of said SPD loads.

* * * * *